United States Patent
Jayanti et al.

(10) Patent No.: US 12,388,885 B2
(45) Date of Patent: *Aug. 12, 2025

(54) DYNAMIC WEB COMPONENT STREAM RENDERER

(71) Applicant: ServiceNow, Inc., Santa Clara, CA (US)

(72) Inventors: Varun Kumar Jayanti, Hyderabad (IN); Soumen Pal, Hyderabad (IN); Raghu Prasad Mulukoju, Hyderabad (IN)

(73) Assignee: ServiceNow, Inc., Santa Clara, CA (US)

(*) Notice: Subject to any disclaimer, the term of this patent is extended or adjusted under 35 U.S.C. 154(b) by 13 days.

This patent is subject to a terminal disclaimer.

(21) Appl. No.: 18/639,802

(22) Filed: Apr. 18, 2024

(65) Prior Publication Data

US 2024/0267420 A1    Aug. 8, 2024

Related U.S. Application Data

(63) Continuation of application No. 17/740,007, filed on May 9, 2022, now Pat. No. 12,015,656.

(51) Int. Cl.
    *H04L 65/61* (2022.01)
(52) U.S. Cl.
    CPC .................. *H04L 65/61* (2022.05)
(58) Field of Classification Search
    CPC ..... H04L 65/61; G06F 16/986; G06F 16/958; G06F 16/9574; G06F 16/9577
    USPC ............................................ 709/231
    See application file for complete search history.

(56) References Cited

U.S. PATENT DOCUMENTS

| | | | |
|---|---|---|---|
| 7,447,738 B1 | 11/2008 | Andrews | |
| 2014/0173744 A1* | 6/2014 | Borohovski | H04L 63/1433 726/25 |
| 2018/0284956 A1* | 10/2018 | Rommel | G06F 16/958 |
| 2021/0240818 A1* | 8/2021 | Seksenov | G06F 16/986 |

FOREIGN PATENT DOCUMENTS

| | | | |
|---|---|---|---|
| AU | 2019397998 | 7/2021 | |
| CN | 112328931 | 2/2021 | |
| CN | 112905175 | 6/2021 | |
| CN | 112905175 A * | 6/2021 | ......... G06F 16/9574 |
| CN | 113254830 | 8/2021 | |
| CN | 114489916 | 5/2022 | |
| CN | 114489916 A * | 5/2022 | ........... G06F 9/4451 |

* cited by examiner

*Primary Examiner* — Glenford J Madamba
(74) *Attorney, Agent, or Firm* — McDonnell Boehnen Hulbert & Berghoff LLP (57) ABSTRACT

An indication associated with a web component of a web content page is received from a client. The indication indicates that a version of the web component is not available at the client. While providing the web content page to the client, the web component is updated to generate an updated web component. In response to the indication, the updated web component is obtained among a plurality of web components. The updated web component for the web content page is provided to the client.

16 Claims, 7 Drawing Sheets

DYNAMIC WEB COMPONENT STREAM RENDERER

CROSS REFERENCE TO OTHER APPLICATIONS

This application is a continuation of U.S. patent application Ser. No. 17/740,007 entitled DYNAMIC WEB COMPONENT STREAM RENDERER filed May 9, 2022 which is incorporated herein by reference for all purposes.

BACKGROUND OF THE INVENTION

A platform-as-a-service (PaaS) environment provides a platform environment on which applications can be deployed. Although hosted on the PaaS, applications can be deployed by a customer of the PaaS, who can continue to maintain, update, and improve the deployed application as required. A PaaS environment allows customers to deploy custom applications on a third-party platform environment, which can include scalable servers, storage and/or database servers, and networking equipment, among other components and functionality. Applications deployed on a PaaS environment include web applications, which can utilize the PaaS environment as the server-side component and web browsers as the corresponding client-side front end.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic web component streaming is disclosed. Using the disclosed techniques, a web page can be dynamically updated at the client with new web components and their corresponding functionality. Details of the new web components are streamed to a client by a server, for example, a server made available as part of a platform-as-a-service (PaaS) environment. The streamed details of a new web component can include a unique identifier, such as a unique name for a new custom web component, and the application data to be utilized by the new web component. In the event elements of the web component, such as functional and/or implementation elements, are not already available at the client, the client can automatically and dynamically retrieve those portions of the new web component and/or the portions are streamed to the client. Once the functional logic of a web component is loaded, the web browser can automatically render the new web component, for example, as an interactive user interface component. In various embodiments, the new web component and its functionality is reusable across multiple applications and deployments. For example, once a new web component is registered, existing and new web applications can leverage the new web component and immediately incorporate its functionality into new as well as existing (and deployed) web applications. Applications that are currently deployed and live can utilize the new web component immediately. In various embodiments, a web component represents a reusable functional container that includes functional logic for execution by a web client, such as a web browser. In some embodiments, the functional logic utilizes application data, such as customer data determined and/or processed on demand, that is dynamically streamed from the PaaS and/or another data source to the web client. In some embodiments, the functional logic of a web component includes functional logic to render custom user interface components including interactive user interface components.

In some embodiments, a web content page is provided. For example, a client requests a web page and the corresponding web content page is provided by a web server such as a web application server. In some embodiments, the web server is hosted on a platform-as-a-service (PaaS) environment. The web content page is configured to dynamically provide a new web component streamed from a server after the web content page has been initially loaded by a client. For example, after the web content page has been received by the client, a developer can update the functionality of the web application by inserting the new functionality as a functional container, such as a web component, to be streamed to the client. In response to the update, a server can dynamically stream new functional logic to the client that updates the displayed web page on the client web browser. In various embodiments, the streamed data includes details or a description of a new web component, such as a unique identifier and/or application data for the web component logic to process. In some embodiments, an indication associated with a desired web component is received. For example, a received indication can be associated with a request for elements of the web component, such as the functional logic of and/or application data related to the new component. In some embodiments, the web component is not already available (for example, is not cached or previously loaded) at the client, and the client can automatically and dynamically retrieve the new web component from a server by first providing a download indication associated with the desired web component. In various embodiments, the web client can determine whether the web component is cached based on an identifier of the web component streamed to the client from the server. In some embodiments, the desired web component is dynamically obtained among a plurality of web components developed on a platform-as-a-service environment separate from the web content page. For example, one or more web components are dynamically downloaded. The functional logic elements of the downloaded web components are retrieved from one or more remote servers after the web content page has been initially loaded by the client. The web components are modular, reusable, and can be developed separately from the web content page and loaded dynamically. In some embodiments, the desired web component is streamed to the web content page. For example, the dynamically retrieved web component is streamed from a remote server and executed to update the web content page displayed by the web client.

Figure 1:
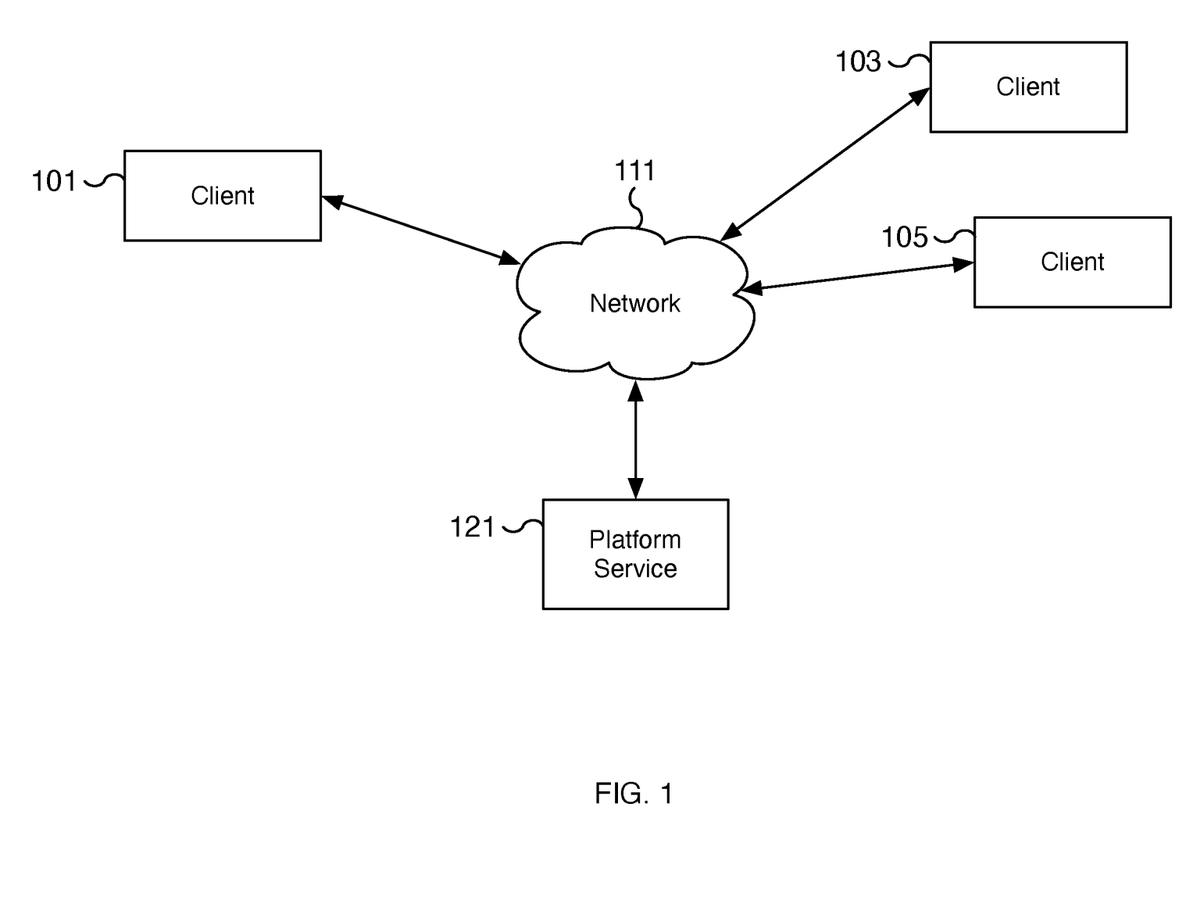
FIG. 1 is a block diagram illustrating an example of a platform-as-a-service network environment for dynamically streaming web components.

FIG. 1 is a block diagram illustrating an example of a platform-as-a-service network environment for dynamically streaming web components. In the example shown, clients 101, 103, and 105 are network clients such as web browsers and access services on platform service 121 via network 111. The services offered by platform service 121 include application services to web clients as well as platform services to customers such as third-party users. Platform services can include the ability to host custom applications and may include access to hardware and software services such as server, storage, database, networking, development, deployment, and/or other functionality. In some embodiments, these services are provided via a cloud service accessible via network 111. Network 111 can be a public and/or private network. In some embodiments, network 111 is a public network such as the Internet.

In the example shown, clients 101, 103, and/or 105 represent network clients including both customer clients to platform service 121 as well as web client front ends to applications hosted on platform service 121 by customers of the platform service. In various embodiments, customers including third-party users of platform service 121 utilize platform service 121 to host applications such as web applications. These web applications can include custom web applications that utilize container-based functional logic components such as web components that are dynamically streamed to the client front end. For example, the content of web applications hosted by platform service 121 and accessible via clients 101, 103, and 105 can be extended by receiving details of new web components without additional modification to an already loaded web page. In various embodiments, the details and functional logic of a utilized web component are dynamically streamed to clients, such as clients 101, 103, and 105, by a server, such as a server of platform service 121 or another remote server.

Although single instances of some components have been shown to simplify the diagram, additional instances of any of the components shown in FIG. 1 may exist. For example, platform service 121 can include one or more application servers, storage services, databases, network routers, security appliances, and/or software tools, among other components. As another example, clients 101, 103, and 105 are just a few examples of potential clients to platform service 121. Fewer or more clients can connect to platform service 121. In some embodiments, components not shown in FIG. 1 may also exist.

Figure 2:
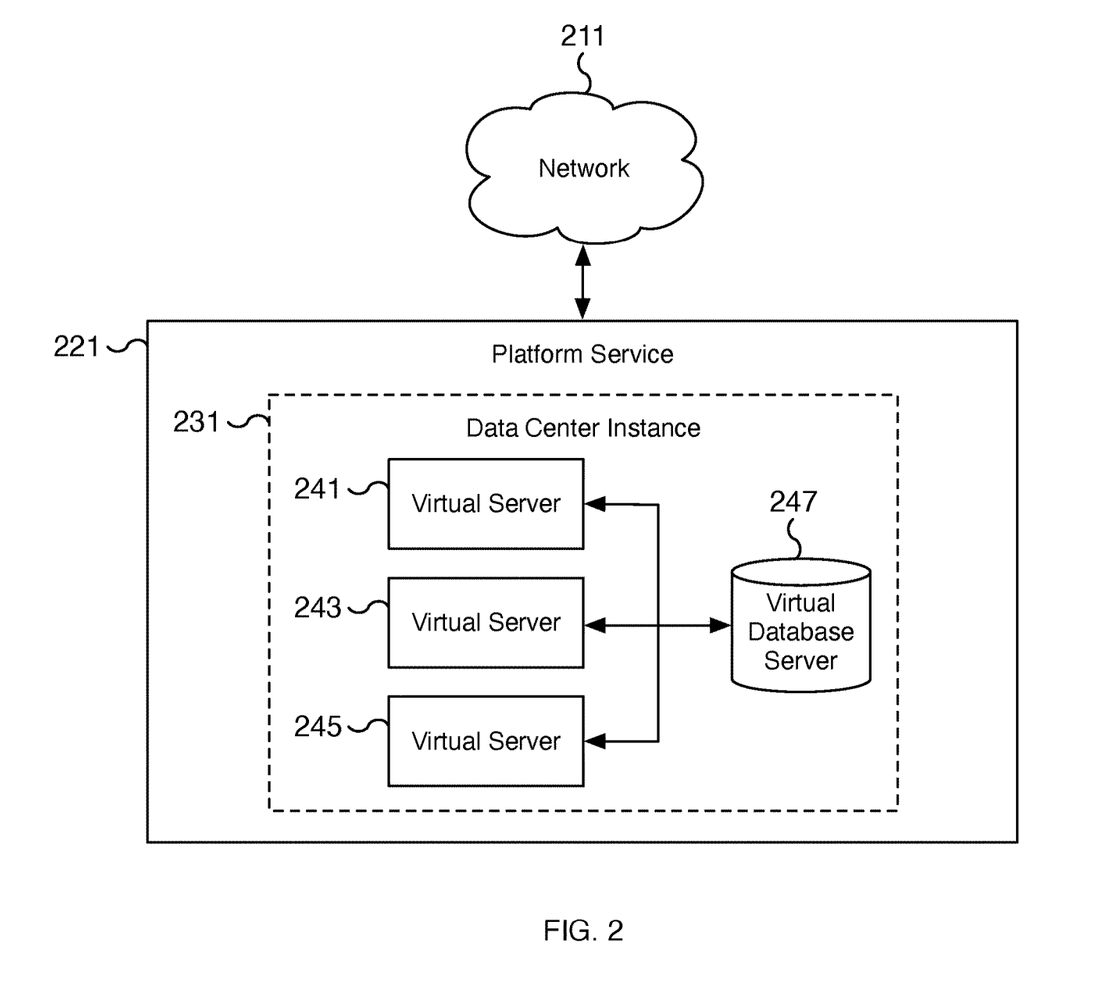
FIG. 2 is a block diagram illustrating an embodiment of a platform service for dynamically streaming web components.

FIG. 2 is a block diagram illustrating an embodiment of a platform service for dynamically streaming web components. In various embodiments, platform service 221 is a platform-as-a-service (PaaS) accessible via network 211. As shown in FIG. 2, example platform service 221 includes data center instance 231, which includes virtual servers 241, 243, and 245 and virtual database server 247. In various embodiments, a platform service can include multiple data center instances, such as data center instance 231, and can include replication across and within the components of a data center instance. Although data center instance 231 is shown with three virtual servers and one virtual database server, additional or fewer virtual servers and similarly additional or fewer virtual database servers can be located within a data center instance. Further, additional components not shown is a data center instance are appropriate as well, including hardware servers used to implement virtual servers and virtual database servers, storage servers, networking equipment, security equipment, management tools, and/or administration tools, among others. In some embodiments, network 211 is network 111 of FIG. 1 and platform service 221 is platform service 121 of FIG. 1.

In some embodiments, one or more of virtual servers 241, 243, and 245 are a web application server and allow for the configuration and support of dynamically streamed web components to clients, such as clients 101, 103, and 105 of FIG. 1, via network 211. For example, one or more of virtual servers 241, 243, and 245 are a web application server that hosts a custom web application accessible via network 211. The web application can rely on data stored in virtual database server 247 and/or another data source. In some embodiments, a third-party user, such as a customer of platform service 221, deploys the custom web application on one or more of virtual servers 241, 243, and 245.

In various embodiments, when a client accesses the web application, the web page content is generated by the application server and provided to the client. The client front end, such as a web browser, loads the web page content and renders the corresponding web page with any applicable application data. Using the disclosed techniques, the web page content is configured to dynamically provide new web components after the web page content has been initially loaded. For example, new functionality can be added to a web application via new web components that do not require a client to access and download a new version of the web page. The new web components can include components developed after the initial web page content is provided. For example, using the disclosed techniques, the client front end can be updated dynamically without modifications to the initially provided web content page by streaming new web components to the client. The new web components can include functional logic that utilizes and retrieves application data for rendering new user interface elements. For example, application data can be displayed in interactive charts, tables, forms, etc. to the user in response to new web components streamed to the client. In various embodiments, the new web components are hosted on and provided to clients by platform service 221 via one or more of virtual servers 241, 243, and 245.

Figure 3:
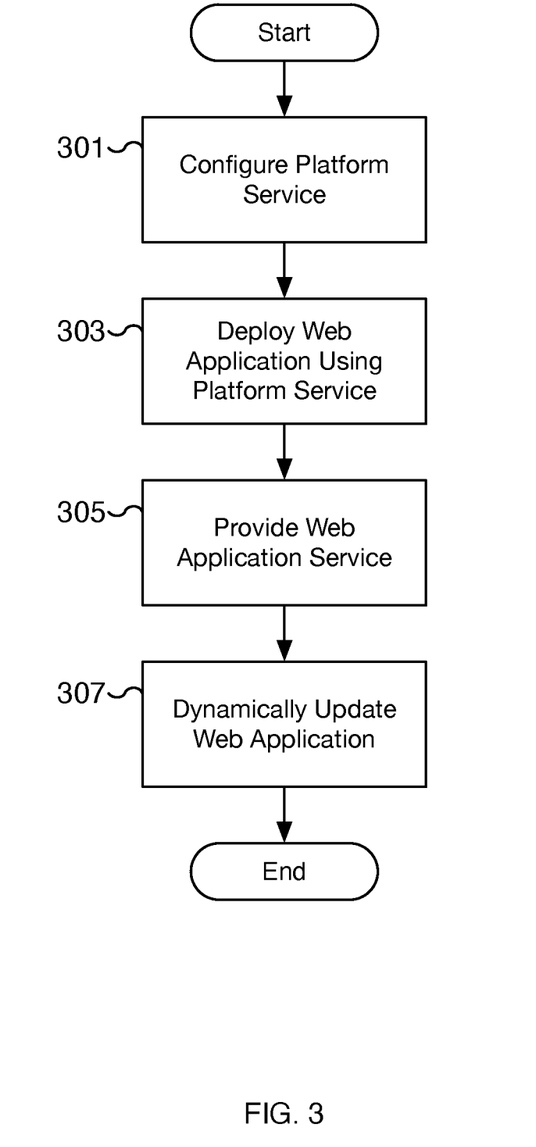
FIG. 3 is a flow chart illustrating an embodiment of a process for creating a dynamic web application service.

FIG. 3 is a flow chart illustrating an embodiment of a process for creating a dynamic web application service. For example, using the process of FIG. 3, a third-party user can host a custom web application using a platform-as-a-service (PaaS) environment. The custom web application functions as a web application service that is available to web clients and can be dynamically updated using new functional containers such as web components. In some embodiments, the new web components are reusable functional containers that include functional logic. In some embodiments, by streaming details of the new web components to a web client, new functionality can be deployed without updating the original web page content and requiring existing clients to reload a new version of the web application. Although described with respect to a PaaS environment, the custom web application can be deployed using the disclosed web component streaming techniques to other environments as well, such as a software-as-a-service (SaaS) environment, a client self-hosted network environment, or to other appropriate network environment configurations. In some embodiments, the PaaS environment used to deploy and host the custom application is platform service 121 of FIG. 1 and/or platform service 221 of FIG. 2. In some embodiments, a web client used to access the custom web application is clients 101, 103, and/or 105 of FIG. 1.

At 301, a platform service is configured. For example, a third-party user configures servers and software frameworks hosted as part of a platform-as-a-service (PaaS) environment. In some embodiments, the platform configuration includes setting up user accounts such as administrator, developer, and management accounts, configuring web application, database, and other servers, configuring networking rules and other policies, etc. In some embodiments, the servers used by the third-party user are virtualized servers including virtual web application servers and virtual database servers. In some embodiments, the configured web application servers are one or more of virtual server 241, 243, and/or 245 of FIG. 2 and the database server is virtual database server 247 of FIG. 2.

At 303, a web application is deployed using the platform service. Using the platform service configured at 301, a custom web application is deployed by a third-party user. In various embodiments, the custom web application utilizes functional containers, such as web components, and one or more web content pages provided by the web application are configured to dynamically provide a new functional container streamed from a server of the platform service. For example, a new web component can be streamed from the platform service to the client.

At 305, a web application service is provided. For example, the custom web application deployed at 303 provides web application services to web clients. Clients such as web clients associated with clients 101, 103, and/or 105 of FIG. 1 can access the deployed web application over a network environment. In various embodiments, the web application is a customer application that provides a user the ability to provide information and/or interact with application data in real time. For example, the application service may provide a chat interface for interacting and sending messages with a live or virtual agent. Additional application service examples include application services that provide a user interface for managing hardware and/or software configuration items for an enterprise, a ticketing system for requesting information technology services, and a booking system for managing travel and expenses, among other application services.

At 307, the web application is dynamically updated. For example, the custom web application configured at 301 and deployed at 303 is updated with new functionality. The new functionality can be implemented using functional containers, such as newly created and registered web components. The new functionality can include new interactive user interface elements and new functional logic for processing application data including newly provided application data. In some embodiments, the functional logic of the web application itself is updated. In some embodiments, the functionality of the web application is updated by configuring the web application in real time, for example, using a developer interface to the web application. For example, a command line interface can be used by a developer to insert new web component functionality to update the web application. Once the new functionality has been inserted, the relevant details of the newly applied web components are streamed to the appropriate web clients accessing the web application. In various embodiments, the relevant details include at least a description or identifier of the newly applied web components. The identifier can include a unique identifier and a resource location, such as a network location identifier, for retrieving the functional logic of the web component. In some embodiments, the unique identifier is a name and/or version number.

Figure 4:
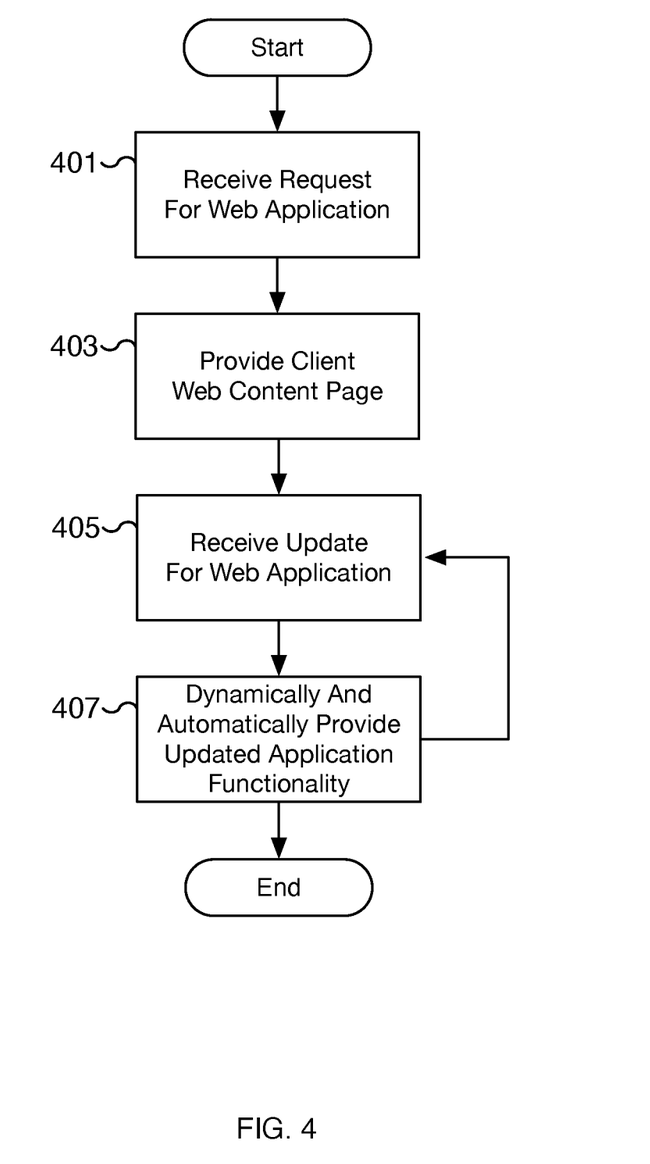
FIG. 4 is a flow chart illustrating an embodiment of a process for dynamically updating a custom web application service.

FIG. 4 is a flow chart illustrating an embodiment of a process for dynamically updating a custom web application service. For example, using the process of FIG. 4, a deployed web application can be updated with new functionality without modifying the existing web page content including web page content already provided to existing web clients. In some embodiments, the web application is deployed by a third-party user using a platform-as-a-service (PaaS) environment or another appropriate application environment where the developer may have limited access to the underlying hardware and/or software. In various embodiments, the new functionality provided by dynamically updating the web application is accessible immediately by web clients without requiring the web clients to access a new version of the web application. In some embodiments, the process of FIG. 4 is performed by a web application server such as one hosted in a PaaS environment. In some embodiments, the PaaS environment used to deploy and host the custom application is platform service 121 of FIG. 1 and/or platform service 221 of FIG. 2 and the relevant web application server is one or more of virtual servers 241, 243, and/or 245 of FIG. 2. In some embodiments, a web client used to access the custom web application is clients 101, 103, and/or 105 of FIG. 1. In some embodiments, the process of FIG. 4 is performed at 305 and/or 307 of FIG. 3.

At 401, a request for a web application is received. For example, a web client requests access to a web application. In various embodiments, the web client accesses the web application through a web browser by initiating a web request to a particular web address. In some embodiments, the access is protected and requires that the user authenticate before access to the application service is provided. Example application services can include a live or virtual chat agent, an interactive user interface for managing enterprise hardware and/or software items, a ticketing system, and a travel booking system, among other application services.

At 403, a web content page is provided to the client. For example, in response to an authenticated web application request, a corresponding web content page is generated and provided to the client. The web content page can be dynamically generated based on the request received and can be customized for the particular user and/or client. In various embodiments, the provided web content page is configured to dynamically provide new web components streamed from a server after the web content page has been initially loaded by a client. This configuration allows the web application to dynamically provide new functionality even after the web application has been loaded by the client.

At 405, an update is received for the web application. For example, new functionality for the web application is configured. In some embodiments, the new functionality is configured and the web application is updated using a developer interface. The developer interface can be a command line only interface, a graphical user interface, and/or another appropriate method of interfacing with the functionality of the web application. In various embodiments, the update to the web application is performed by inserting new web components and their functionality into the existing web application. This process can be performed without updating the initial web content page provided to the client at 403. In some embodiments, the process can be performed by users who have limited or no access privileges to the original web application source code.

At 407, updated web application functionality is dynamically and automatically provided. For example, the update performed at 405 results in new application functionality that is provided in real time to clients that have requested the web application, including clients that were provided the original web content page at 403. Existing clients that have already loaded the web page content are provided with the new functionality via streamed information of the newly inserted web components. In some instances, only details related to the newly inserted web components are required to provide the new functionality. For example, in the event the newly inserted web component is already cached by the web client, the new functionality is provided without an additional request for the functional logic of the web component. In some embodiments, the determination that the newly inserted web component is cached or not is based on whether the web client has local access to an existing web component with the same identifier of the newly inserted web component. The identifier can be a unique identifier such as a name and/or version number. In the event the client has not already loaded the functional logic of a new web component, the streamed information of the newly inserted web component includes a resource location for retrieving the required functional logic. Once the functional logic is retrieved, the new functionality is provided to the client. In some embodiments, the new functionality includes interactive user interface elements such as interactive charts, tables, diagrams, and user interface form elements. The new functionality can be further populated with newly streamed application data. Although the new functionality is described with respect to a newly inserted web component, in some embodiments, the new functionality is implemented using a reusable functional logic container that includes functional logic for execution at the client.

Figure 5:
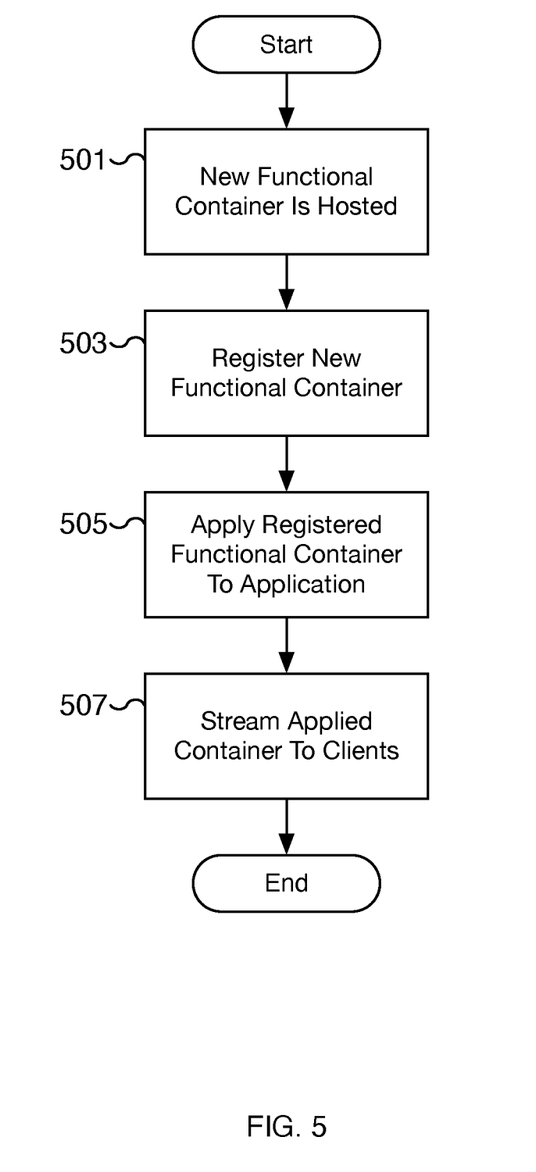
FIG. 5 is a flow chart illustrating an embodiment of a process for dynamically updating a custom web application using a dynamically inserted functional container component.

FIG. 5 is a flow chart illustrating an embodiment of a process for dynamically updating a custom web application using a dynamically inserted functional container component. For example, using the process of FIG. 5, a deployed web application can be updated with new functionality without modifying the existing web page content including web page content already provided to existing web clients. The new functionality is implemented by dynamically inserting one or more functional container components, such as new web components, into the web application. In various embodiments, the process of FIG. 5 allows the web application to be dynamically updated with limited access to the server-side and client-side components of the web application. For example, portions of the process of FIG. 5 can be performed by users who have limited or no access privileges to the original web application source code. In some embodiments, the process of FIG. 5 is performed to update a web application hosted by a platform-as-a-service (PaaS) environment. In some embodiments, the PaaS environment used to deploy and host the custom application is platform service 121 of FIG. 1 and/or platform service 221 of FIG. 2 and the relevant web application server is one or more of virtual servers 241, 243, and/or 245 of FIG. 2. In some embodiments, a web client used to access the custom web application is clients 101, 103, and/or 105 of FIG. 1. In some embodiments, the process of FIG. 5 is performed at 307 of FIG. 3 and/or at 405 and/or 407 of FIG. 4.

At 501, a new functional container is hosted. For example, a new functional container such as a web component is implemented and hosted on a server. The new functional container implements new functionality that can be included in a web application. In some embodiments, the new functional container, such as a web component, is hosted on the PaaS used to host the custom web application although another different server or servers can be used to host and/or replicate the new functional container as well. In various embodiments, the functional container includes functional logic such as source code for execution by a client such as a client web browser and can further include programming instructions for rendering one or more HTML elements. In some embodiments, the functional logic included in the functional container such as a web component is implemented using a programming language such as JavaScript for processing application data and manipulating HTML and/or other web elements.

At 503, the new functional container is registered. For example, the new functional container hosted at 501 is made accessible to a web application by registering the functional container in a registry of allowed web components. In some embodiments, the registry is a registry of allowed web components and is maintained by the server and/or PaaS used to host an applicable web application. In various embodiments, only registered functional containers can be dynamically inserted into a custom application. The registration process can be required, at least in part, to limit execution of malicious or untested functional logic. In some embodiments, the registration process includes providing a unique identifier, such as a unique name, for the newly registered functional container. In some embodiments, the registration process includes providing version number and/or access privileges associated with the newly registered functional container.

At 505, a registered functional container is inserted into a web application. For example, a newly registered web component is inserted into an existing and deployed web application. The insertion can be performed via a developer interface such as a command line interface by executing a command line and referencing a unique identifier of the registered web component. In some embodiments, the newly registered functional container is inserted using a graphical user interface for managing web applications. In various embodiments, the step of 505 can be performed by a user, such as a developer, administrator, live agent, or another appropriate user, who has limited or no access privileges to the original web application source code. For example, a live agent participating in a chat conversation with a client can insert new functionality provided by a web component for displaying booking information for a specific ticket request.

At 507, details of the inserted functional container are streamed to clients. For example, details of a new functional container inserted at 505 are streamed to clients with the web application running. In some embodiments, the details are a description of the functional container that includes a unique identifier of a web component, such as a unique name of a web component, and are provided by the PaaS hosting the web application. In various embodiments, the details can further include a version number and/or network resource location identifier for downloading/obtaining the functional logic of the container, such as the source code used to implement the functional logic of a web component. In some embodiments, the details are streamed to clients that have the associated web application running and are made available without requiring the clients to load a new version of the web application. In the event the functional container is not already loaded at the client, for example, in the event the web component is a new web component, the client can download the functional logic of the web component using a provided resource location. For example, the functional logic of the web component can be streamed to the client via the PaaS hosting the web application and/or another source. Once the functional logic is loaded by the client, the new functionality can be provided to the user by executing the functional logic associated with the newly provided functional container. In various embodiments, the functional container is implemented using web components and allows the client to provide new functionality including the ability to render new user interface elements. In some embodiments, newly streamed functional containers are appended to the end of the web page content at the client, allowing them to execute and provide updated functionality.

Figure 6:
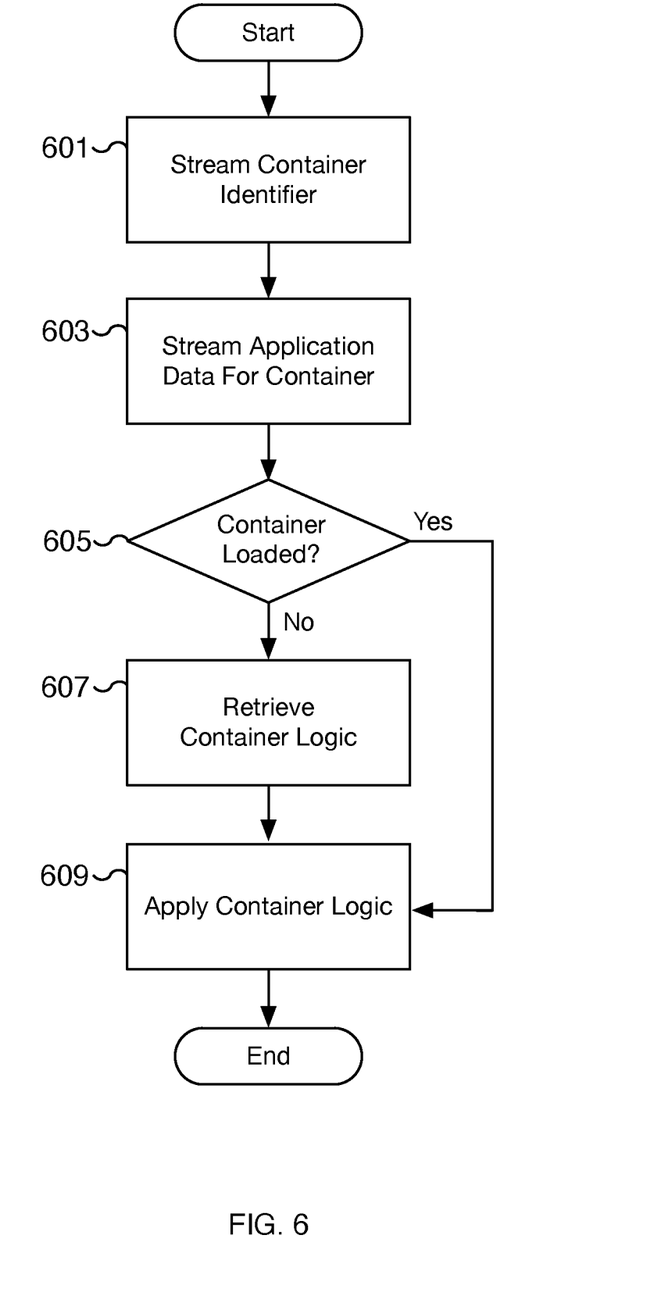
FIG. 6 is a flow chart illustrating an embodiment of a process for applying a dynamic update to a custom web application using a dynamically inserted functional container component.

FIG. 6 is a flow chart illustrating an embodiment of a process for applying a dynamic update to a custom web application using a dynamically inserted functional container component. For example, using the process of FIG. 6, a deployed web application that has been updated with one or more new functional containers, such as new web components, is updated and provides new functionality to a client. In various embodiments, this functionality is provided without modifying the existing web page content including web page content already provided to existing web clients. In some embodiments, the process of FIG. 6 is initiated by users who have limited or no access privileges to the original web application source code. In some embodiments, the process of FIG. 6 is performed in response to an update to a web application hosted by a platform-as-a-service (PaaS) environment. In some embodiments, the PaaS environment used to host the custom application and stream functional container information is platform service 121 of FIG. 1 and/or platform service 221 of FIG. 2. In some embodiments, the relevant web application server is one or more of virtual servers 241, 243, and/or 245 of FIG. 2. In some embodiments, a web client used to access the custom web application is clients 101, 103, and/or 105 of FIG. 1. In some embodiments, the process of FIG. 6 is performed at least in part at 307 of FIG. 3, at 407 of FIG. 4, and/or at 507 of FIG. 5.

At 601, a functional container identifier is streamed to the client. For example, an identifier, such as a web component name, is streamed from a server to the client to indicate that the corresponding functional container should be inserted into the web content page. In some embodiments, the identifier is a name such as a name or source code class name of a web component. In some embodiments, the identifier includes a version number or other parameters that are used together with the name to uniquely identify the functional container. In various embodiments, the details of the functional container streamed with the container identifier include a network resource location identifier where the functional container can be retrieved from. For example, the functional container details include a Uniform Resource Locator (URL) where a relevant web component is hosted for download.

At 603, application data for the functional container is streamed to the client. For example, data such as customer or client data is streamed to the client for processing by the newly inserted functional container. In some embodiments, the data is retrieved from a database or storage server such as virtual database server 247 of FIG. 2 or another location. In some embodiments, the data is generated locally by the client and/or other portions of the web page content. In various embodiments, the application data is provided to the web client for processing by the functional logic of the functional container identified at 601. In some embodiments, the application data is streamed to the client after the functional logic is loaded. For example, application data can be streamed to the client as part of executing the functional logic of the functional container at step 609.

At 605, a determination is made whether the functional container is loaded. In the event the functional container is not loaded, processing proceeds to 607. For example, in some instances, the web component inserted is a new or newly registered web component and has never been used by the client. As a result, the client has not had an opportunity to previously load the referenced web component locally and will need to retrieve a copy of the functional container at 607 before its corresponding functional logic can be executed. In the event the functional container is loaded, processing proceeds to 609. For example, the functional container may have been used previously (by the same and/or different web application) and is cached at the web client. A copy of the functional container is available locally and the retrieval step performed at 607 can be skipped. In various embodiments, a cache hit determination can be made based on the identifier of the functional container identifier streamed to the client at 601.

At 607, the functional container is retrieved. In various embodiments, a location of the functional container is streamed to the client. Using the provided location, the client accesses and retrieves a copy of the functional container for local use. In some embodiments, the location is a Uniform Resource Locator (URL) and a corresponding web component can be downloaded via the provided URL. In some embodiments, once the functional container is retrieved, it is cached at the web client for use with future web pages. In some embodiments, the retrieved functional container includes functional logic such as source code to perform processing logic by the web client including rendering of user interface elements and processing of application data.

In some embodiments, the functional container is retrieved first by the server and then provided to the client by the server. For example, in the event the server does not have a copy of a web component, the server will download the web component and stream it to the client. In some embodiments, both the server and/or the client can cache the web component. In some embodiments, the server receives a download indication for the functional container identified at 601. The server obtains the requested functional container and streams it to the client. In some embodiments, the functional container is stored on the PaaS, for example, in a storage server and/or database server from which it is obtained.

At 609, the functional logic of the functional container is applied. For example, the functional logic, such as client-side processing logic implemented in JavaScript or another appropriate programming or scripting language, is executed at the web client. In some embodiments, the newly inserted functional container is a web component appended to the web page content. By inserting the new functional container into the web page content, the corresponding functional logic stored in the container is executed when applied. In some embodiments, the functional container is applied by inserting or adding the corresponding web component to a particular element associated with the HTML document of the web page content and its document model. In various embodiments, the application of the functional logic can include execution of client-side processing for rendering new user interface functionality, processing client provided data, and/or processing retrieved or streamed application data, among other processing logic.

Figure 7:
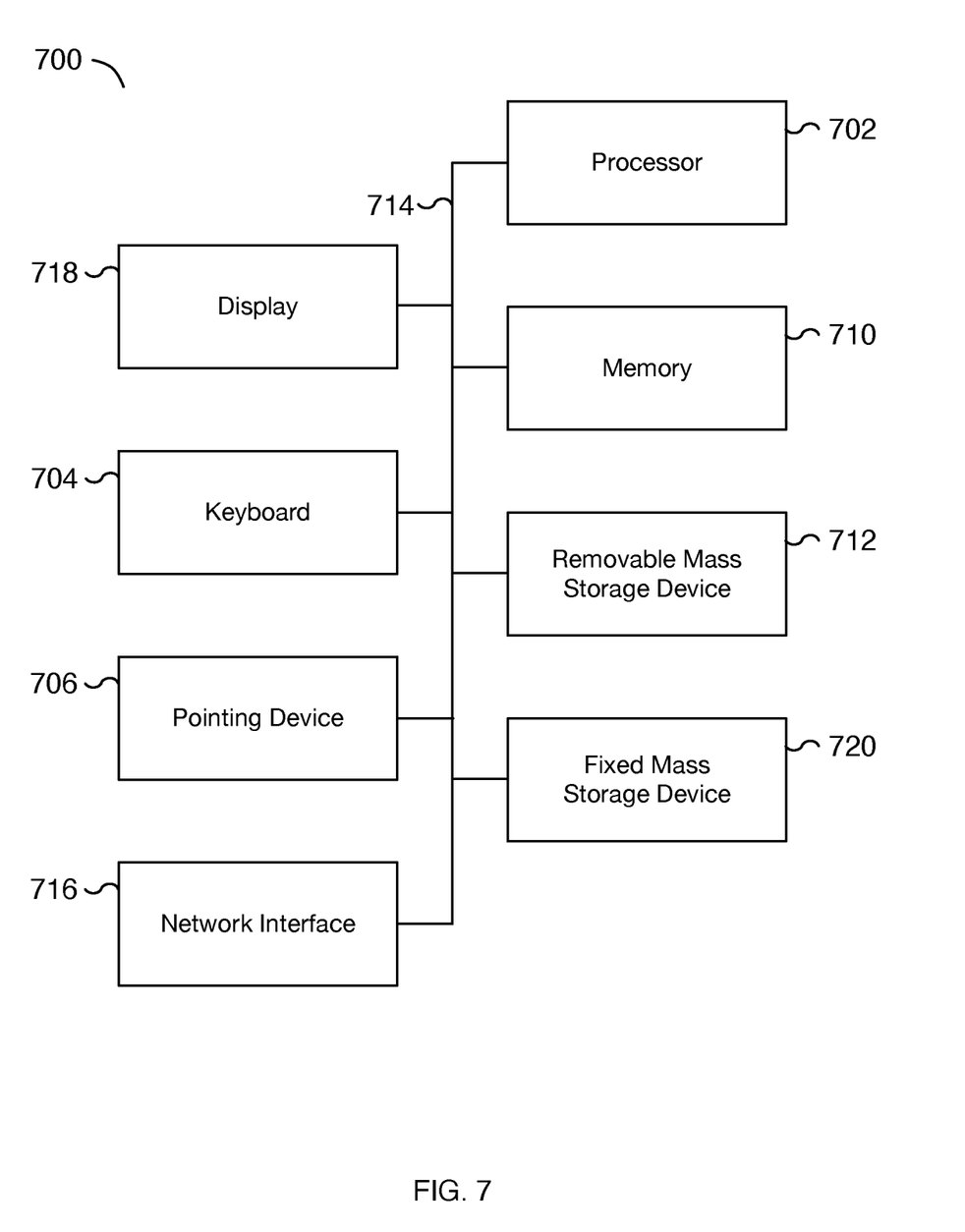
FIG. 7 is a functional diagram illustrating a programmed computer system for dynamically streaming web components.

FIG. 7 is a functional diagram illustrating a programmed computer system for dynamically streaming web components. As will be apparent, other computer system architectures and configurations can be used for creating a dynamic web application service. Examples of computer system 700 include servers utilized for configuring and dynamically streaming web components used by web applications to clients. In some embodiments, computer system 700 is the client device that communicates with a web application server and/or web client. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718). In various embodiments, one or more instances of computer system 700 can be used to implement at least portions of the processes of FIGS. 3-6.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or unidirectional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or unidirectionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storages 712, 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving, from a client, an indication associated with a web component of a web content page, wherein the indication indicates that a version of the web component is not available at the client;
while providing the web content page to the client, updating the web component to generate an updated web component, wherein the updated web component includes updated functional logic configured to display a user interface element when executed by the client; in response to the indication, obtaining the updated web component among a plurality of web components; and
providing, to the client, the updated web component for the web content page, wherein the web content page is configured to provide the updated web component streamed from a server after the web content page has been initially loaded by the client.

2. The method of claim 1, wherein the indication is received after the web content page has been loaded by the client.

3. The method of claim 1, further comprising providing an identifier of the web component, wherein the identifier of the web component includes one or more of a network location identifier, a source code class name, or a version number to differentiate between one or more different versions of the web component.

4. The method of claim 1, wherein the plurality of web components is developed on a platform-as-a-service environment separately from the web content page and updated after providing the web content page.

5. The method of claim 1, wherein the updated web component is provided automatically without requiring user intervention to update the web component.

6. The method of claim 1, wherein the updated web component implements a functionality absent from the web content page initially loaded by the client.

7. The method of claim 1, further comprising streaming application data to the client, and wherein the updated web component is configured to process the application data.

8. The method of claim 1, wherein the user interface element is configured to display streamed application data.

9. A system, comprising:
one or more processors configured to:
receive, from a client, an indication associated with a web component of a web content page, wherein the indication indicates that a version of the web component is not available at the client;
while providing the web content page to the client, update the web component to generate an updated web component, wherein the updated web component includes updated functional logic configured to display a user interface element when executed by the client;
in response to the indication, obtain the updated web component among a plurality of web components; and
provide, to the client, the updated web component for the web content page, wherein the web content page is configured to provide the updated web component streamed from a server after the web content page has been initially loaded by the client; and
a memory coupled to at least one of the one or more processors and configured to provide instructions.

10. The system of claim 9, wherein the indication is received after the web content page has been loaded by the client.

11. The system of claim 9, wherein the one or more processors are configured to provide an identifier of the web component, wherein the identifier of the web component includes one or more of a network location identifier, a source code class name, or a version number to differentiate between one or more different versions of the web component.

12. The system of claim 9, wherein the plurality of web components is developed on a platform-as-a-service environment separately from the web content page and updated after providing the web content page.

13. The system of claim 9, wherein the updated web component is provided automatically without requiring user intervention to update the web component.

14. The system of claim 9, wherein the updated web component implements a functionality absent from the web content page initially loaded by the client.

15. The system of claim 9, wherein the one or more processors are configured to stream application data to the client, wherein the updated web component is configured to process the application data.

16. A computer program product, the computer program product being embodied in a non-transitory computer readable storage medium and comprising computer instructions for:
receiving, from a client, an indication associated with a web component of a web content page, wherein the indication indicates that a version of the web component is not available at the client;
while providing the web content page to the client, updating the web component to generate an updated web component, wherein the updated web component includes updated functional logic configured to display a user interface element when executed by the client; in response to the indication, obtaining the updated web component among a plurality of web components; and
providing, to the client, the updated web component for the web content page, wherein the web content page is configured to provide the updated web component streamed from a server after the web content page has been initially loaded by the client.

* * * * *